(12) United States Patent
D'Onofrio (10) Patent No.: US 7,631,982 B1
(45) Date of Patent: *Dec. 15, 2009

(54) LIGHT ATTACHMENT SYSTEM

(75) Inventor: Vincent G. D'Onofrio, Selbyville, DE (US)

(73) Assignee: Mr. Go Green, Inc., Selbyville, DE (US)

( * ) Notice: Subject to any disclaimer, the term of this patent is extended or adjusted under 35 U.S.C. 154(b) by 45 days.

This patent is subject to a terminal disclaimer.

(21) Appl. No.: 12/037,983

(22) Filed: Feb. 27, 2008

Related U.S. Application Data (60) Provisional application No. 60/964,014, filed on Aug. 9, 2007.

(51) Int. Cl.
*F21S 8/00* (2006.01)

(52) U.S. Cl. .................. 362/151; 362/147; 362/152; 362/432

(58) Field of Classification Search .......... 362/147, 362/151–152, 248, 432
See application file for complete search history.

(56) References Cited

U.S. PATENT DOCUMENTS

| | | | | |
|---|---|---|---|---|
| 3,584,795 | A * | 6/1971 | Baird | .................. 362/396 |
| 3,596,859 | A | 8/1971 | MacDonald | |
| 3,599,918 | A | 8/1971 | Patchett | |
| 3,861,632 | A * | 1/1975 | Siilats | .................. 248/224.7 |
| 5,056,747 | A | 10/1991 | Kireta | |
| 5,062,028 | A * | 10/1991 | Frost et al. | .................. 362/183 |
| 5,469,344 | A | 11/1995 | Kotsakis | |
| 5,496,005 | A | 3/1996 | Dieringer | |
| D376,973 | S | 12/1996 | Brown | |
| 5,707,136 | A | 1/1998 | Byers | |
| 5,921,511 | A | 7/1999 | LaPointe | |
| 6,572,062 | B1 | 6/2003 | Limber et al. | |
| 6,827,379 | B2 | 12/2004 | Hill et al. | |

OTHER PUBLICATIONS

Affortable Quality Lighting Inc., "Solar Wall Light", <retrieved from http://www.affordablequalitylighting.com/docs/outdoor/wall/utility/pwsolar/index.html Apr. 2, 2008> 4pages.
Intermatic, Inc., Malibu—Lighting the Way to Outdoor Living, retrieved at <http://malibulights.com> on Feb. 25, 2008, 2 pgs.
Solar E-Clips, Solar Perimeter Outdoor Lighting, retrieved at <http://www.solareclips.ca/gallery.html> on Jan. 11, 2008, 2 pgs.

* cited by examiner

*Primary Examiner*—Sandra L O'Shea
*Assistant Examiner*—Meghan K Dunwiddie (57) ABSTRACT

A light attachment system for efficiently attaching outdoor lights to a building structure (e.g. house, shed, etc.). The light attachment system generally includes a support including a hanger portion and a projecting portion, wherein the projecting portion extends from the hanger portion and wherein the hanger portion includes a cavity defined by the hanger portion. A securing member is attached to the hanger portion and extends at least partially within the cavity to attach the support to various objects, such as a rain gutter or an outside wall of a building. A light source extends from the projecting portion to illuminate the surrounding environment.

18 Claims, 9 Drawing Sheets

LIGHT ATTACHMENT SYSTEM

CROSS REFERENCE TO RELATED APPLICATIONS

I hereby claim benefit under Title 35, United States Code, Section 119(e) of U.S. provisional patent application Ser. No. 60/964,014 filed Aug. 9, 2007. The 60/964,014 filed application is currently pending. The 60/964,014 filed application is hereby incorporated by reference into this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to outdoor lighting and more specifically it relates to a light attachment system for efficiently attaching outdoor lights to a building structure (e.g. house, shed, etc.).

2. Description of the Related Art

Any discussion of the related art throughout the specification should in no way be considered as an admission that such related art is widely known or forms part of common general knowledge in the field.

Outdoor lights have been in use for years. Outdoor lighting is utilized for many purposes and is manufactured in various types of configurations and sizes. Outdoor lighting may be efficiently utilized in public areas (e.g. street lights, billboard lights, etc.) and also for use around residential homes (e.g. security lights, etc.). Prior art has provided many popular types of outdoor lights. Most of these lights consist of permanent structures that must be directly wired to the building (e.g. home, etc.) itself which can make it difficult to add or remove lights as desired.

Another common type of outdoor lighting utilized is solar lights, wherein the solar lights are generally utilized to light pathways or sidewalks. These types of lights generally stick in the ground which makes it difficult to easily install the lights around a doorway of the building or around the perimeter of the building for various reasons, such as difficulty in inserting the light within the ground because of surrounding concrete, placement of the lights in heavily traffic area can cause individuals to trip over the lights. The lights also generally direct the light source upwards from adjacent the ground surface, wherein it may be more efficient and desirable to direct the light source downwards from above the individual. Because of the inherent problems with the related art, there is a need for a new and improved light attachment system for efficiently attaching outdoor lights to a building structure (e.g. house, shed, etc.).

BRIEF SUMMARY OF THE INVENTION

The general purpose of the present invention is to provide a light attachment system that has many of the advantages of the outdoor lights mentioned heretofore. The invention generally relates to an outdoor light which includes a support including a hanger portion and a projecting portion, wherein the projecting portion extends from the hanger portion and wherein the hanger portion includes a cavity defined by the hanger portion. A securing member is attached to the hanger portion and extends at least partially within the cavity to attach the support to various objects, such as a rain gutter or an outside wall of a building. A light source extends from the projecting portion to illuminate the surrounding environment.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

An object is to provide a light attachment system for efficiently attaching outdoor lights to a building structure (e.g. house, shed, etc.).

Another object is to provide a light attachment system that is portable.

An additional object is to provide a light attachment system that provides for an efficient perimeter lighting source for a building.

An additional object is to provide a light attachment system that easily attaches to a rain gutter (eaves trough) of a building.

A further object is to provide a light attachment system that may attach directly to the wall of a building (e.g. garage, business, home, etc.).

Another object is to provide a light attachment system that allows for the support and the light to removably attach.

Another object is to provide a light attachment system that utilizes solar energy to provide power for the light source.

Other objects and advantages of the present invention will become obvious to the reader and it is intended that these objects and advantages are within the scope of the present invention. To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
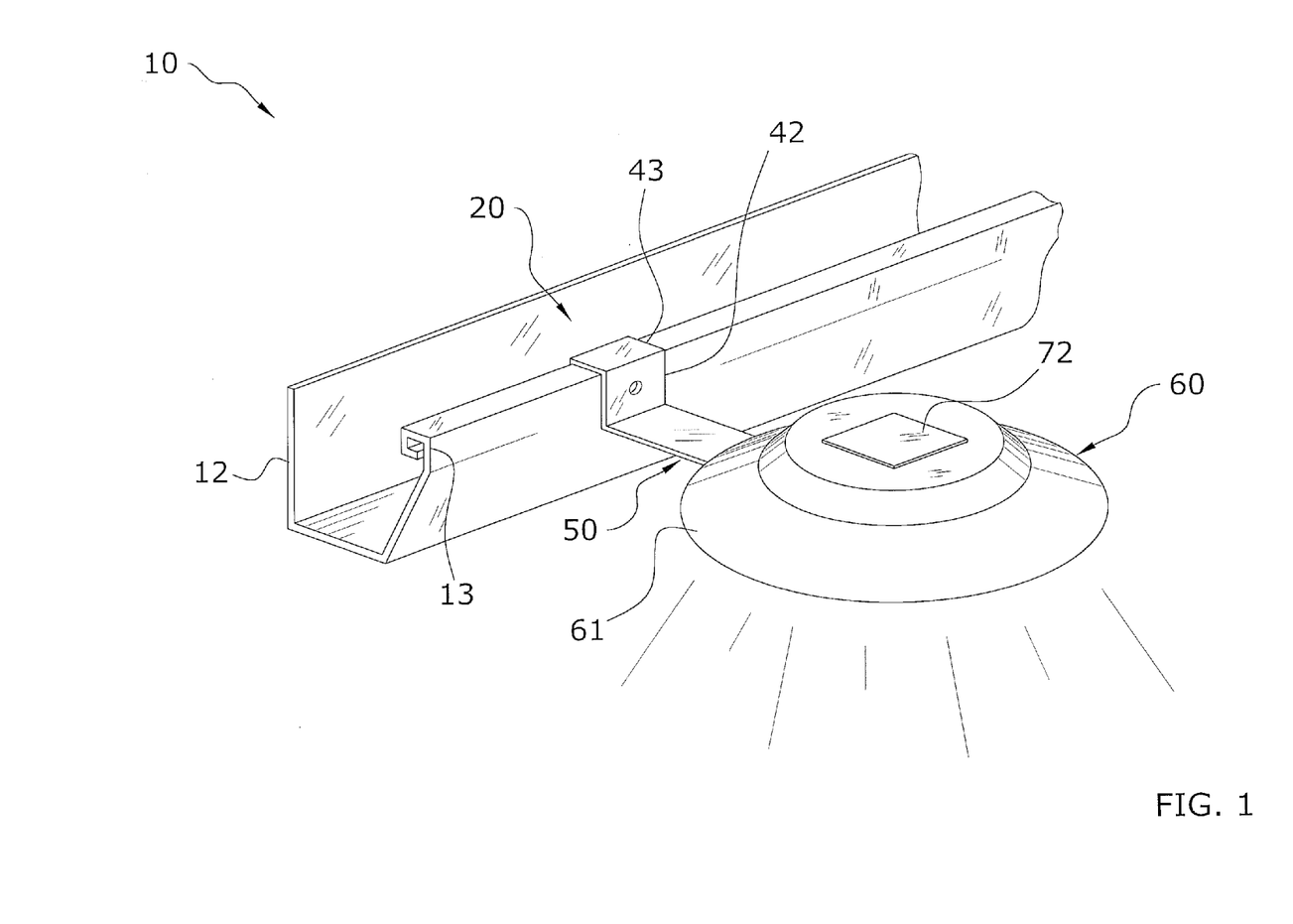
FIG. 1 is an upper perspective view of the present invention in use.
Figure 2:
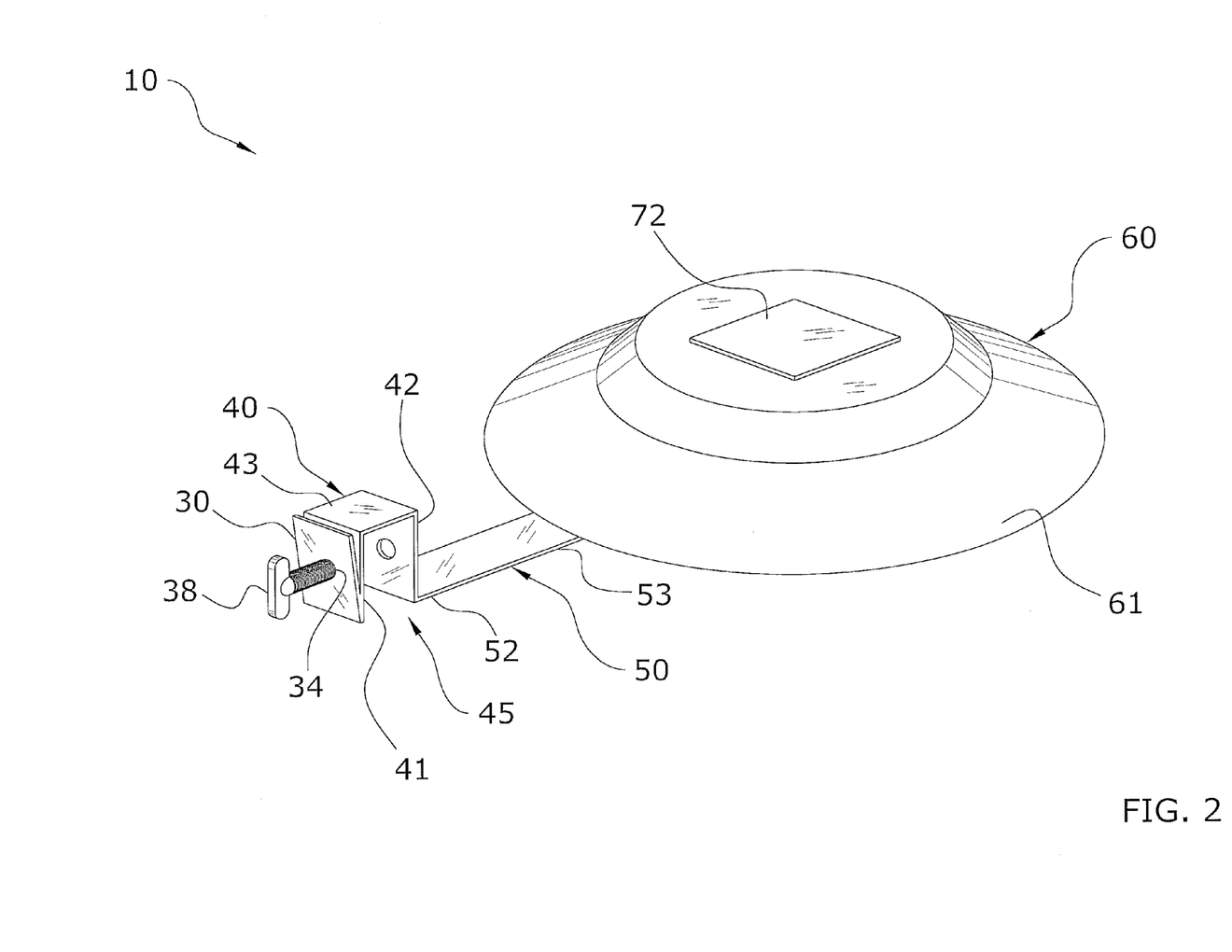
FIG. 2 is an upper perspective view of the present invention.
Figure 3:
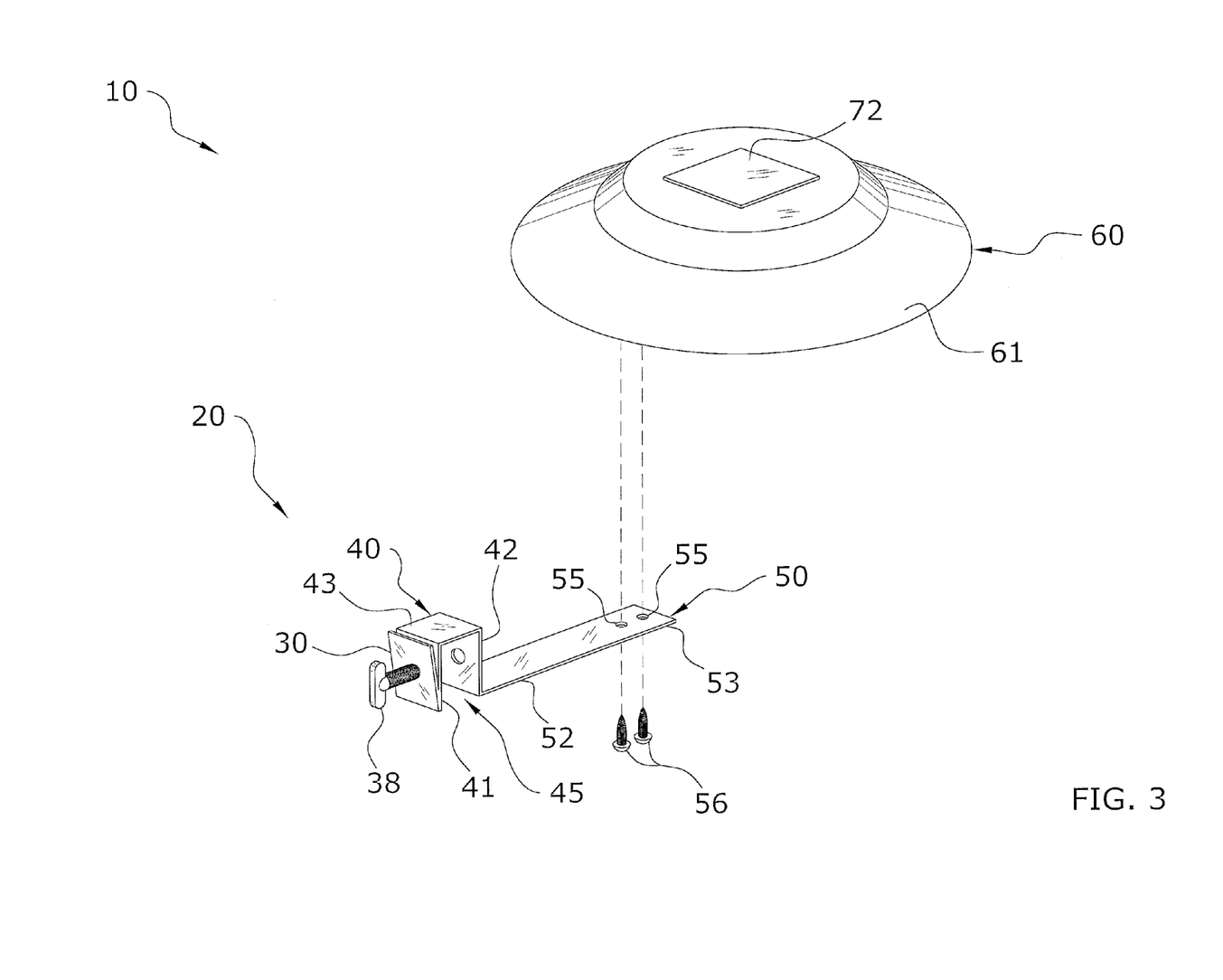
FIG. 3 is an upper perspective view of the present invention with the light exploded from the support.
Figure 4:
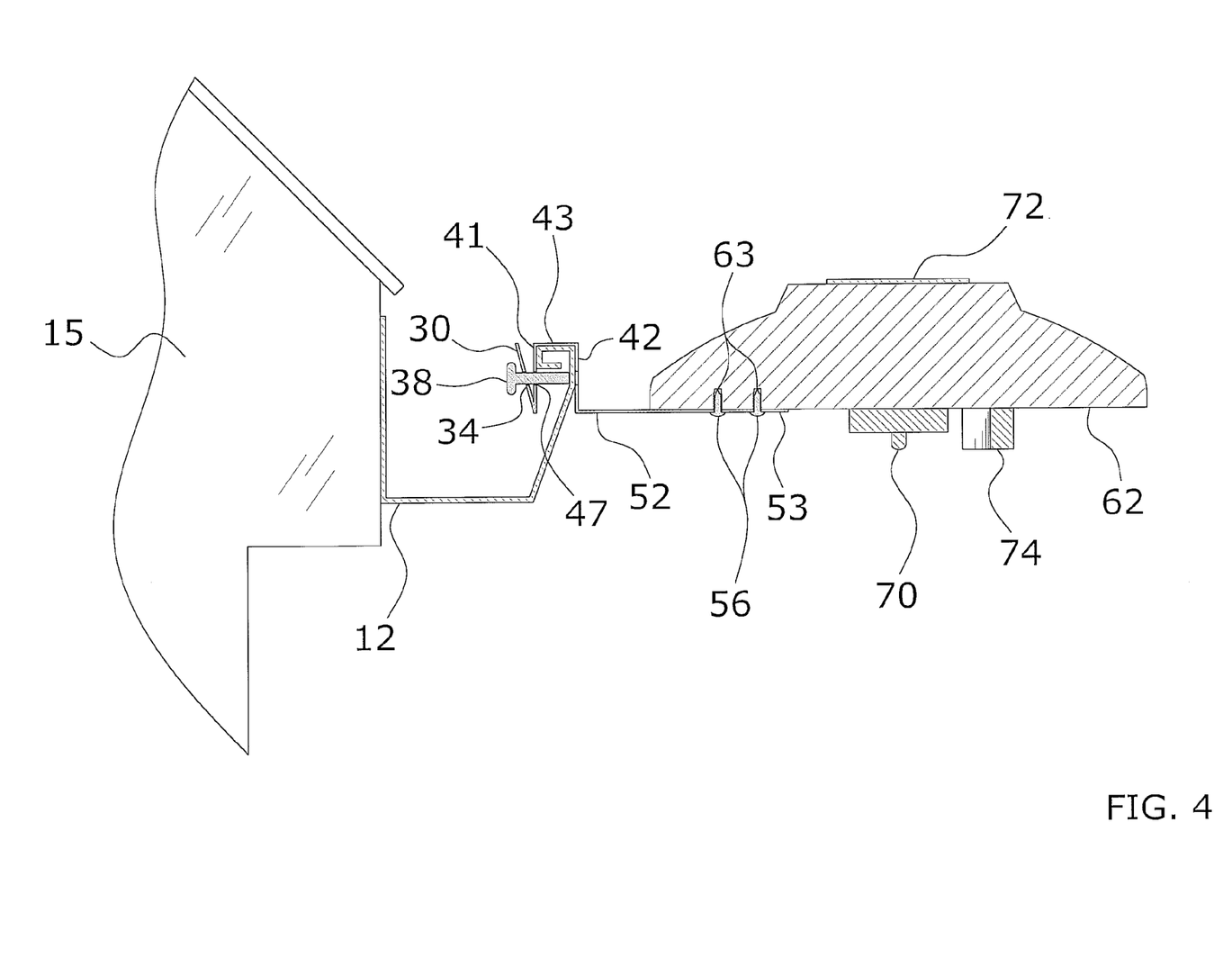
FIG. 4 is a side sectional view of the present invention in use and attached to a rain gutter.
Figure 5:
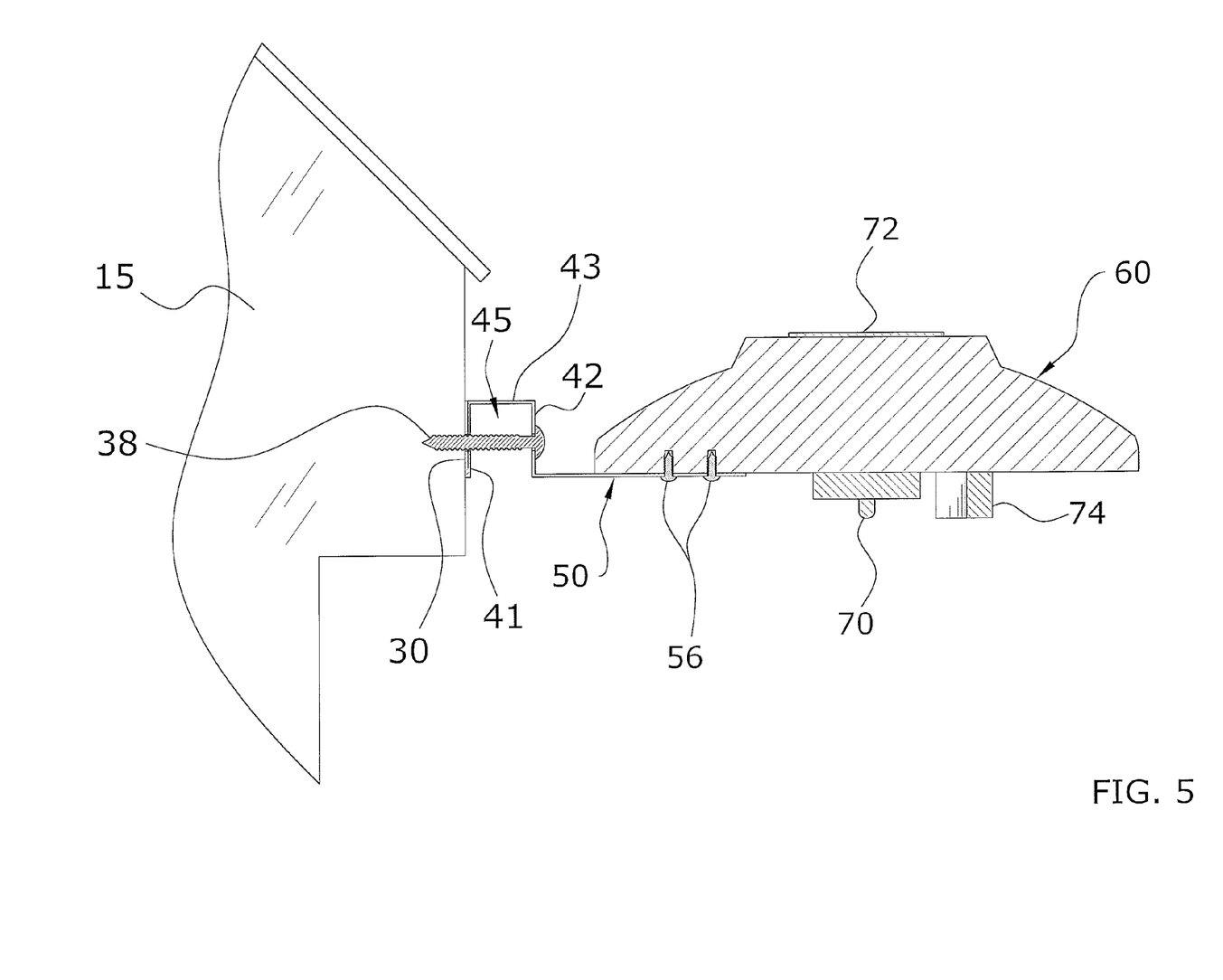
FIG. 5 is a side sectional view of the present invention in use and attached directly to a building.
Figure 6:
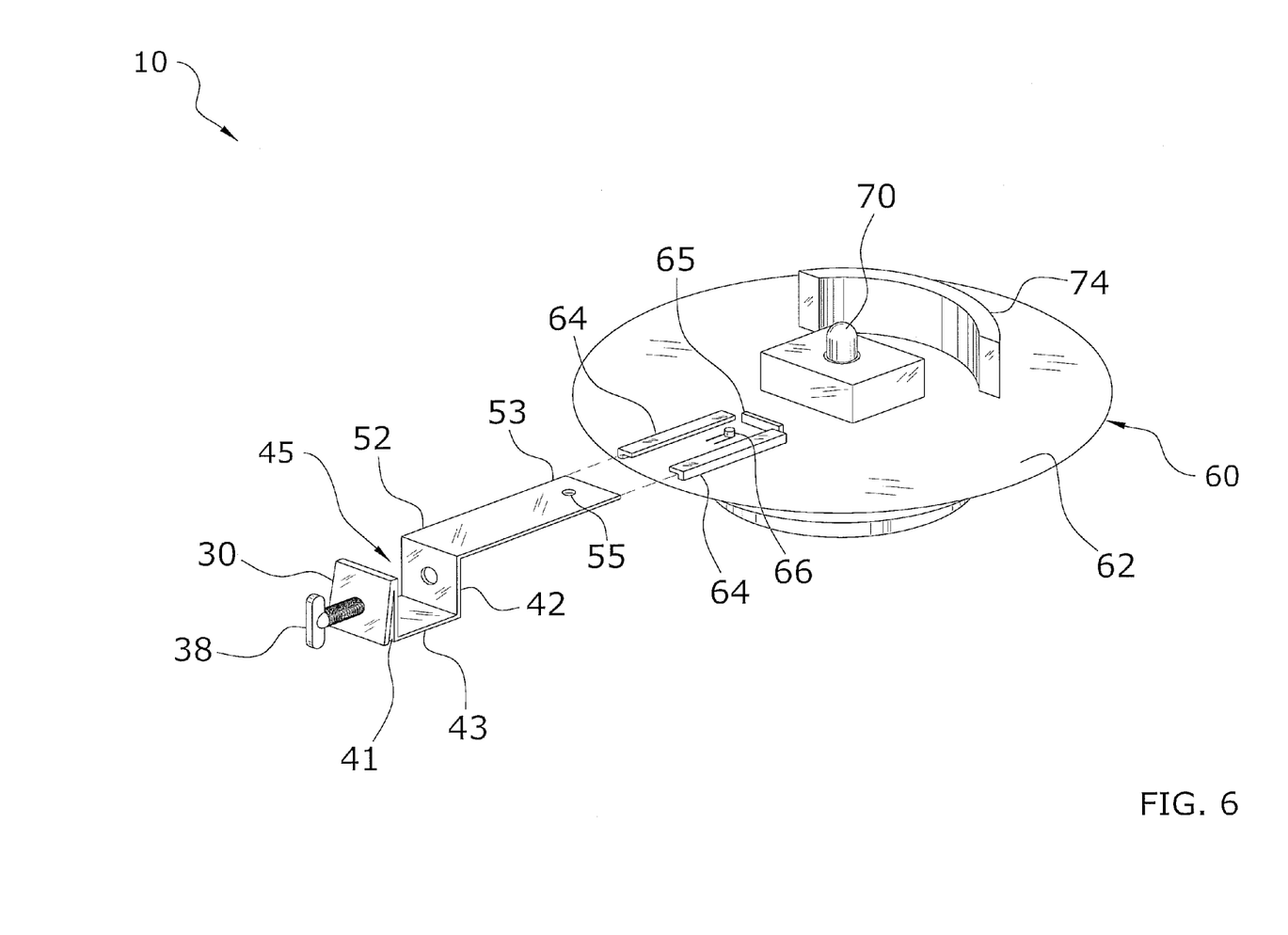
FIG. 6 is an upper perspective view of the present invention with the light exploded from the support, wherein an alternate manner in which the support may attach to the light is illustrated.
Figure 7:
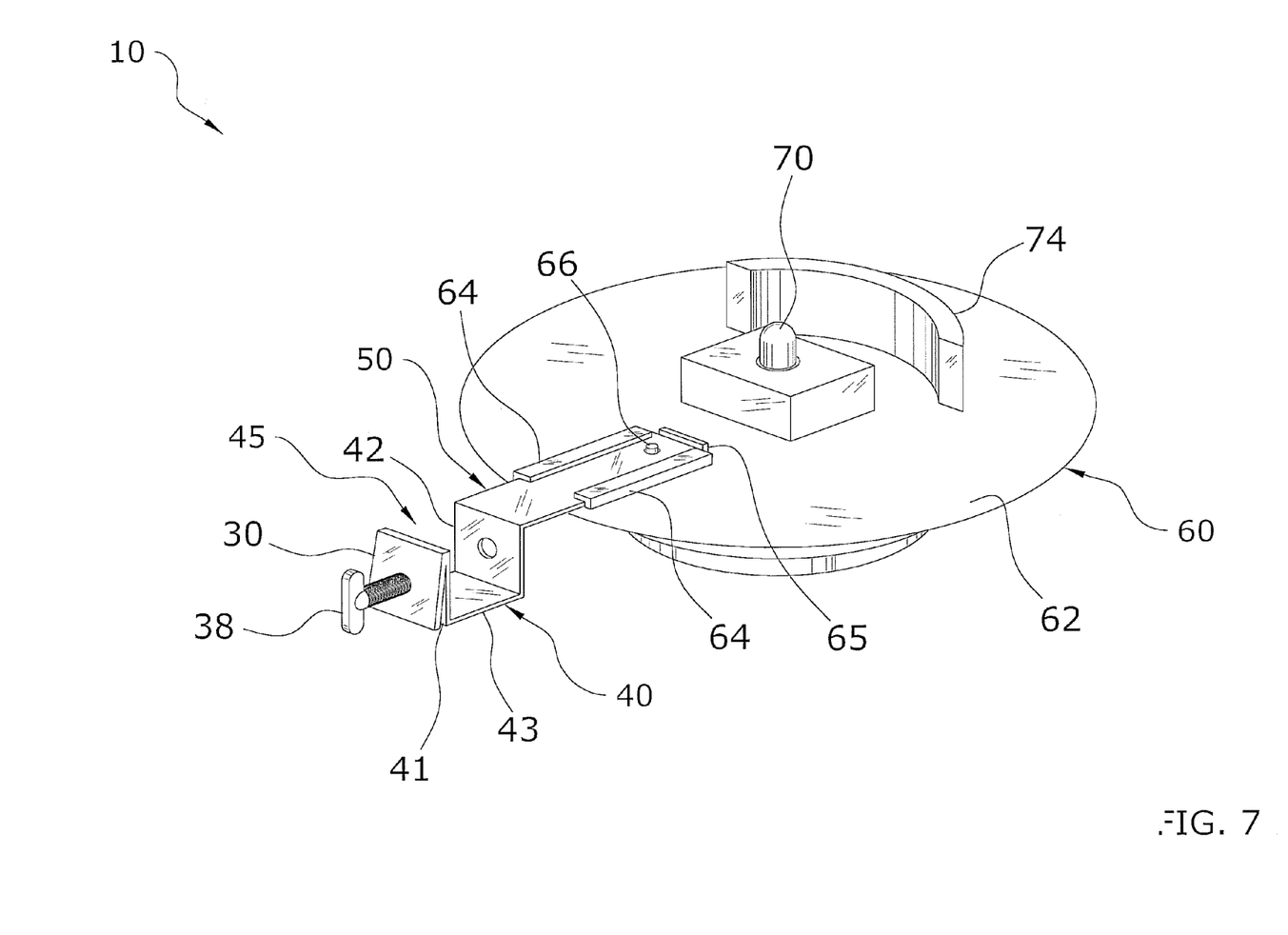
FIG. 7 is an upper perspective view of the present invention, wherein an alternate manner in which the support may attach to the light is illustrated.
Figure 8:
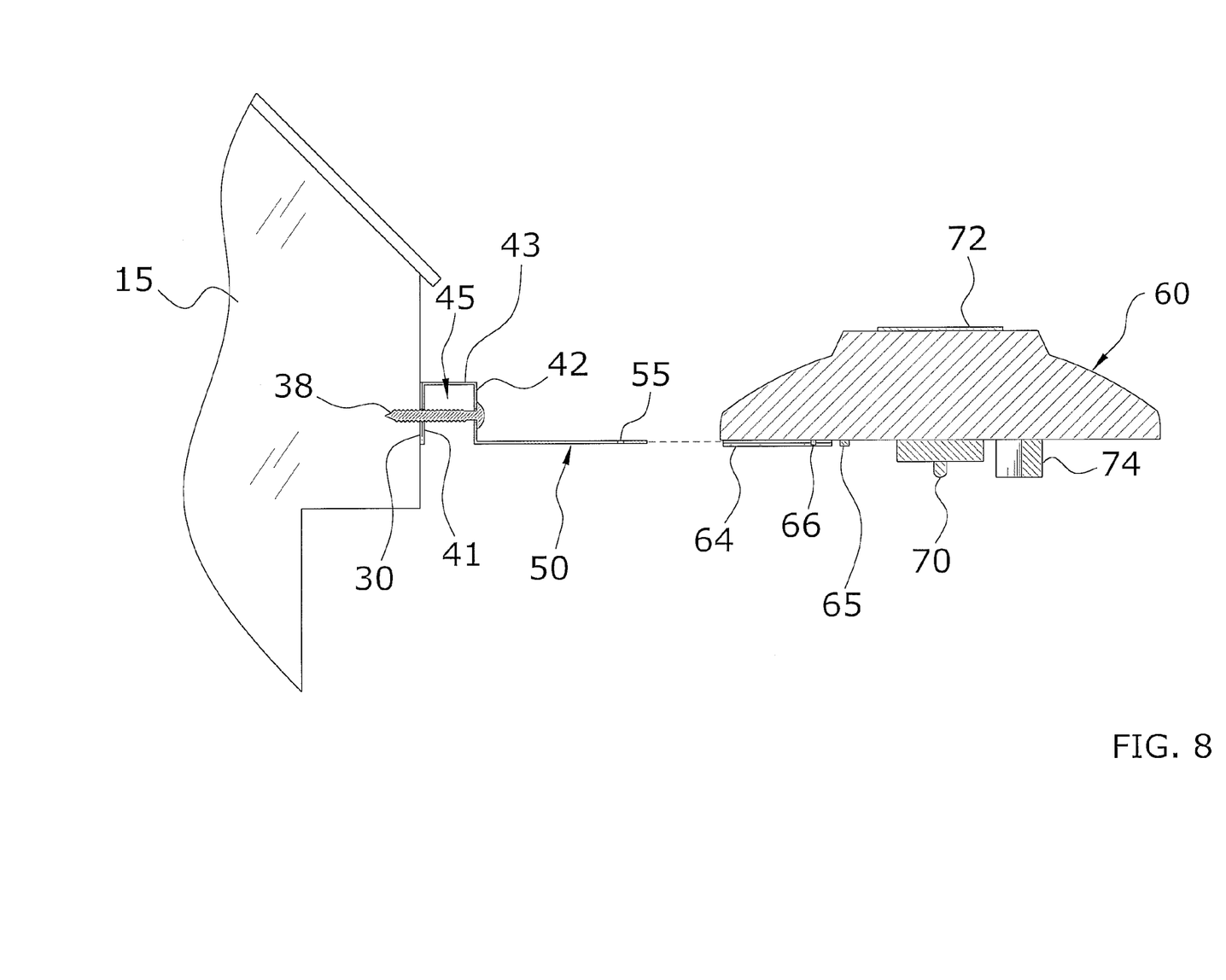
FIG. 8 is a side sectional view of the present invention in the embodiment illustrated in FIG. 6 and FIG. 7, with the light exploded from the support and the support attached directly to a building.
Figure 9:
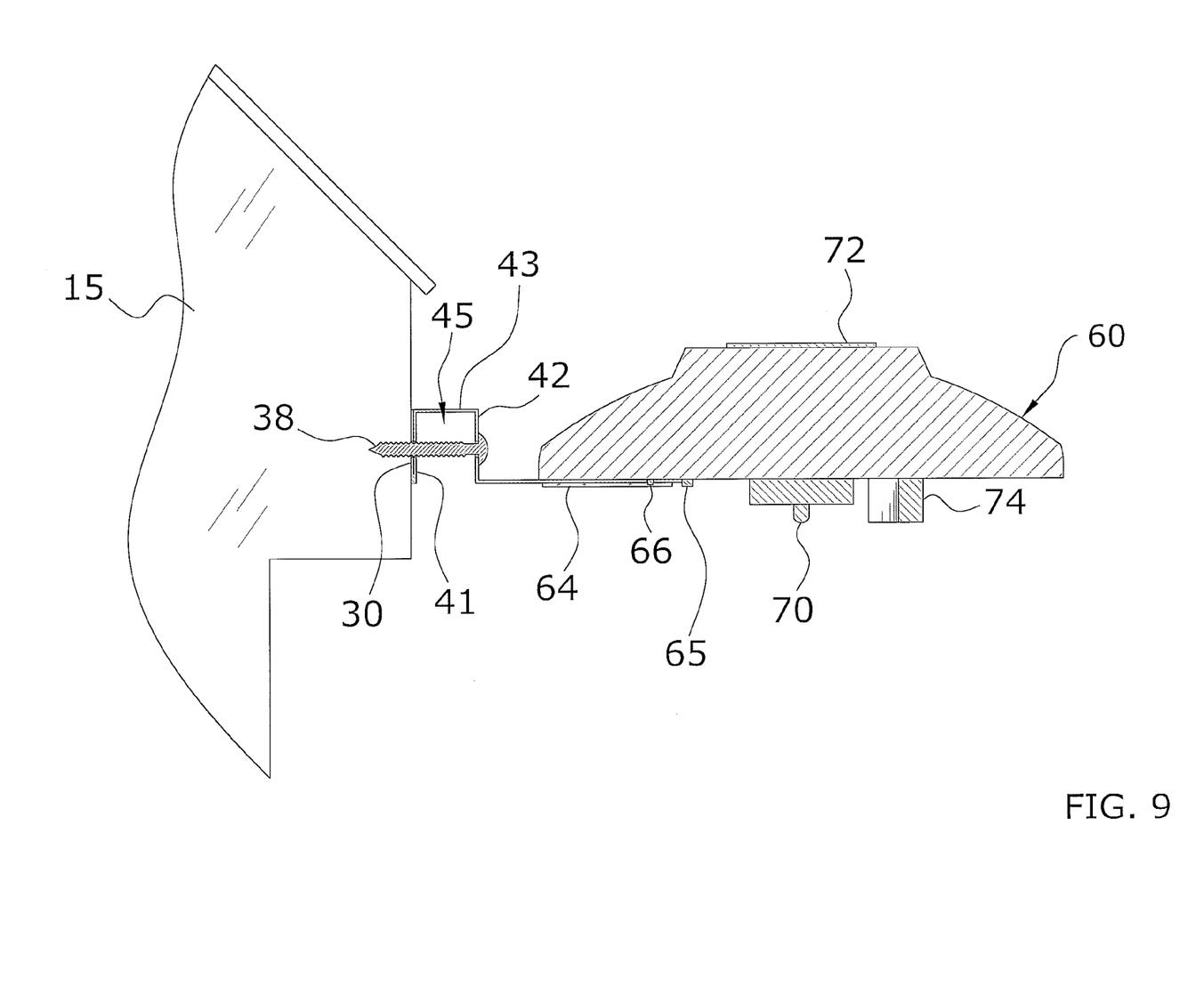
FIG. 9 is a side sectional view of the present invention in the embodiment illustrated in FIG. 6 and FIG. 7, with the light attached to the support and the support attached directly to a building.

Turning now descriptively to the drawings, in which similar reference characters denote similar elements throughout the several views, FIGS. 1 through 7 illustrate a light attachment system 10, which comprises a support 20 including a hanger portion 40 and a projecting portion 50, wherein the projecting portion 50 extends from the hanger portion 40 and wherein the hanger portion 40 includes a cavity 45 defined by the hanger portion 40. A securing member 38 is attached to the hanger portion 40 and extends at least partially within the cavity 45 to attach the support 20 to various objects, such as a rain gutter 12 or an outside wall of a building 15. A light source 70 extends from the projecting portion 50 to illuminate the surrounding environment.

B. Support

The support 20 attaches a light 60 to a building structure, wherein the building structure may comprised of rain gutter 12 an outer wall of the building 15 or various other types of structure. The support 20 may also attach the light 60 to various other types of objects, such as but not limited to a tree, a fence or various others. The support 20 preferably removably attaches to the desired object or structure so as to allow an individual to move the present invention if desired.

The support 20 is also comprised of a material that may withstand harsh and prolonged outdoor weather without wearing away or becoming damaged, such as but not limited to metal or plastic. The support 20 is also preferably substantially lightweight (e.g. such as in a thin metal or plastic strip configuration) so as to be able to hang and attach to a rain gutter 12 without damaging or disrupting the operation or configuration of the rain gutter 12. It is appreciated that although the present invention is primarily utilized in an outdoor environment, the present invention may be installed and utilized indoors as well.

The support 20 preferably includes a securing portion 30, a hanger portion 40 extending from the securing portion 30 and a projecting portion 50 extending from the hanger portion 40. The securing portion 30 and the hanger portion 40 work together to attach the support 20 to the rain gutter 12 and the projecting portion 50 is utilized to attach the light 60 to the support 20. It is appreciated that the securing portion 30 may be omitted and the hanger portion 40 directly attaches to the wall of a building 15 or simply pivoted against the first downward portion 41. The securing portion 30 is also preferably pivots with respect to the hanger portion 40, wherein the securing portion 30 is pivotally connected to a first downward portion 41 of the hanger portion 40.

The securing portion 30 is preferably positioned upon an innermost portion of the support 20. A first aperture 34 also extends through the securing portion 30 to receive a securing member 38 along with an aperture extending through the hanger portion 40. The securing member 38 may be comprised of various types of structures (e.g. hand screw, bolt, etc.) all which are capable or tightening the support 20 upon the rain gutter 12. The securing portion 30 is also preferably vertically oriented to match the orientation of the inner wall of the outer lip 13 of the rain gutter 12. The first aperture 34 is also preferably threadably formed to threadably receive the securing member 38.

Extending from the lower end of the securing portion 30 is the hanger portion 40. The hanger portion 40 extends over the outer lip 13 of the rain gutter 12. The hanger portion 40 is preferably comprised of a substantially U-shaped configuration and includes the first downward portion 41, an upper portion 43 horizontally extending from the first downward portion 41 and a second downward portion 42 vertically extending from the upper portion 43 opposite the first downward portion 41. A cavity 45 is also defined between the first downward portion 41, the upper portion 43 and the second downward portion 42, wherein the outer lip 13 of the rain gutter 12 is positioned within the cavity 45. The first downward portion 41, the upper portion 43 and the second downward portion 42 are preferably comprised of an integrally formed structure. Likewise the securing portion 30, the hanger portion 40 and the projecting portion 50 are preferably comprised of an integrally formed structure.

The first downward portion 41 angles downward from the upper portion 43 and the second downward portion 42 extends vertically downward from the opposing end of the upper portion 43 to surround the outer lip 13 of the rain gutter 12. The first downward portion 41 preferably extends at a slight 60 downward angle which may have various benefits, such as but not limited to allowing the support 20 to be tightened more fixedly upon the rain gutter 12 and also to allow the hanger portion 40 to accommodate various cross-sectional widths of outer lips 13 of rain gutters 12. It is appreciated that the first downward portion 41 may extend perpendicularly from the upper portion 43 in various alternate embodiments of the present invention, such as but not limited to when attaching the support 20 directly to the outer wall of the building 15.

A second aperture 47 also preferably extends through the first downward portion 41 and aligns with the first aperture 34 to receive the securing member 38. The second aperture 47 may also be threadably formed to threadably receive the securing member 38. The second downward portion 42 is preferably parallel to the outside edge of the outer lip 13 of the rain gutter 12 to allow the projecting portion 50 to extend perpendicularly outward from the rain gutter 12 at all times and in a stable manner (i.e. support 20 is not allowed to pivot about the rain gutter when secured to the rain gutter 12).

The inner end 52 of the projecting portion 50 extends from the lower end of the second downward portion 42. The projecting portion 50 is preferably perpendicular to a vertical plane and the outer wall of the building 15 via being perpendicular to the second downward portion 42. The projecting portion 50 is also preferably comprised of an elongated configuration so as to extend the light 60 substantially away from the rain gutter 12. It is appreciated that the projecting portion 50 may be comprised of various lengths as desired. The projecting portion 50 may also extend at various angles and include various angled bends to direct the light source 70 from light 60 in various angles or from various different heights.

The projecting portion 50 preferably includes at least one first receiver opening 55. The first receiver opening 55 preferably extends through the projecting portion 50 substantially near an outer end 53 of the projecting portion 50 and is preferably centered upon the projecting portion 50. In a first embodiment of the present invention, the projecting portion 50 includes a pair of first receiver openings 55, wherein the receiver openings 55 receive fasteners 56 (e.g. screws, bolts, rivets, etc.) to attach to the support 20 to the light 60. In a second embodiment of the present invention, the projecting portion 50 includes a single receiver opening 55 to attach to a slidable connecting structure of the light 60.

C. Light

The light 60 removably attaches to the projecting portion 50 of the support 20. The light 60 may be comprised of various configurations, wherein the light 60 is preferably comprised of an outdoor light 60 configuration. The light 60 is also preferably comprised of a solar light 60 configuration; however it is appreciated that the light 60 may utilize various types of power sources to operate.

In the preferred embodiment, the light 60 includes a casing 61 and a light source 70 directed outwardly from the casing 61, wherein the light source 70 is preferably comprised of at least one LED. The light 60 also preferably includes at least one solar cell 72 to charge a battery within the light 60 and thus provide the light source 70 with power. The battery may be comprised of various types of batteries, such as but not limited to a rechargeable battery and preferably is able to provide adequate power to the light source 70 for at least 8-10 hours (i.e. duration of the night) between charges.

The light 60 may also include various other electronics commonly associated with solar lights 60, such as but not limited to a photo resistor to automatically turn the light source 70 on and off according to the darkness of the surrounding environment and a controller to control the current flow between the light source 70, the battery, the solar cell 72 and the photo resistor.

The light source 70 may also include a deflector member 74 extending from an underside 62 of the casing 61. The deflector member 74 is preferably comprised of a curved configuration and serves to partially surround the light source 70 and assist in directing the light source 70 in a downward manner. The deflector member 74 may include various reflective properties or be comprised of various reflective materials to further assist redirecting the light source 70.

In the preferred embodiment, the projecting portion 50 attaches to an underside 62 of the casing 61; however it is appreciated that the projecting portion 50 may attach to various locations upon the casing 61. The portion of the underside 62 of the casing 61 that the projecting portion 50 attaches to may be comprised of various configurations. In one embodiment, the underside 62 includes a pair of second receiver openings 63 to align with the first receiver openings 55, wherein the second receiver openings 63 are preferably threadably formed to threadably receive the fasteners 56 and secure the light 60 to the projecting portion 50.

In another embodiment of the casing 61, a pair of channel members 64 slidably receive the outer end 53 of the projecting portion 50, wherein the first receiver opening 55 is received by a catch member 66 via slidably positioning the outer end 53 of the projecting portion 50 between the channel members 64. The catch member 66 pivots downward with respect to the casing 61 to allow a portion of the projecting portion 50 to extend past the catch member 66 and engage a stopper member 65 and then the catch members 66 pivots upward within the first receiver opening 55 when the first receiver opening 55 and the catch member 66 are aligned. It is appreciated that the light 60 may attach to the support 20 in various other manners rather than those previously described.

D. Operation of Preferred Embodiment

In use, the light 60 is first attached to the projecting portion 50 via a plurality of fasteners 56 or the catch member 66 and channel members 64. The securing member 38 is now loosened so as to not extend within the cavity 45 and the hanger portion 40 is positioned over the outer lip of 13 the rain gutter 12 with the light 60 directed outwards. Once the support 20 is positioned in a desired location, the securing member 38 may be tightened until the securing member 38 engages the inside of the outer lip 13 and can be tightened no further. The light 60 now utilizes solar energy to recharge the batteries during the day so that the batteries may supply power to the light source 70 to shine at night.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims (and their equivalents) in which all terms are meant in their broadest reasonable sense unless otherwise indicated. Any headings utilized within the description are for convenience only and have no legal or limiting effect.

I claim:

1. A light attachment system, comprising:
   a support including a hanger portion and a projecting portion, wherein said projecting portion extends from said hanger portion;
   wherein said hanger portion includes a cavity defined by said hanger portion;
   wherein said support includes a securing portion extending from said hanger portion opposite said projecting portion;
   a securing member attached to said hanger portion and extending at least partially within said cavity;
   wherein said securing member extends through said securing portion; and
   a light source extending from said projecting portion.

2. The light attachment system of claim 1, wherein said hanger portion is comprised of a substantially U-shaped configuration.

3. The light attachment system of claim 1, wherein said hanger portion includes an upper portion, a first downward portion extending from said upper portion and a second downward portion extending from an opposing end of said upper portion as said first downward portion.

4. The light attachment system of claim 3, including an aperture extending through said first downward portion to receive said securing member.

5. The light attachment system of claim 4, wherein said aperture is threadably formed to threadably receive connect to said securing member.

6. The light attachment system of claim 1, wherein said securing member threadably attaches to said securing portion.

7. The light attachment system of claim 1, wherein said securing portion is pivotally connected to said hanger portion.

8. The light attachment system of claim 1, wherein said projecting portion slidably attaches to a casing of said light source.

9. The light attachment system of claim 8, wherein said casing includes a catch member to be received within a receiver opening of said projecting portion.

10. The light attachment system of claim 9, wherein said catch member pivots with respect to said casing.

11. The light attachment system of claim 1, including at least one fastener to attach said projecting portion to a casing of said light source.

12. The light attachment system of claim 1, wherein said light source is solar powered.

13. The light attachment system of claim 1, wherein said support attaches to a rain gutter.

14. The light attachment system of claim 1, wherein said support attaches to an outside wall of a building.

15. A light attachment system, comprising:
- a support including a hanger portion and a projecting portion, wherein said projecting portion extends from said hanger portion;
- wherein said hanger portion is comprised of a substantially U-shaped configuration;
- wherein said hanger portion includes a cavity defined by said hanger portion;
- a securing member threadably attached to said hanger portion and extending at least partially within said cavity; and
- a light source extending from said projecting portion.

16. The light attachment system of claim 15, wherein said support includes a pivotally connected securing portion extending from said hanger portion opposite said projecting portion.

17. The light attachment system of claim 15, wherein said hanger portion extends over an outer lip of a rain gutter to attach said support to said rain gutter.

18. A light attachment system, comprising:
- a support including a hanger portion and a projecting portion, wherein said projecting portion extends from said hanger portion;
- wherein said support includes a pivotally connected securing portion extending from said hanger portion opposite said projecting portion;
- wherein said securing portion includes a first aperture;
- wherein said hanger portion includes an upper portion, a first downward portion extending from said upper portion and a second downward portion extending from an opposing end of said upper portion;
- wherein said hanger portion includes a second aperture, wherein said second aperture aligns with said first aperture;
- wherein said hanger portion is comprised of a substantially U-shaped configuration;
- wherein said hanger portion includes a cavity defined by said hanger portion;
- a securing member threadably attached to said hanger portion and extending at least partially within said cavity;
- wherein said securing member is threadably attached to said securing portion and said hanger portion via said first aperture and said second aperture; and
- a light source extending from said projecting portion.

* * * * *